(12) United States Patent
Li (10) Patent No.: US 12,069,367 B2
(45) Date of Patent: Aug. 20, 2024

(54) IMAGE PROCESSING METHOD AND APPARATUS, AERIAL CAMERA AND STORAGE MEDIUM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 179 days.

(21) Appl. No.: 17/660,510

(22) Filed: Apr. 25, 2022

(65) Prior Publication Data

US 2022/0247928 A1 Aug. 4, 2022

Related U.S. Application Data

(63) Continuation of application No. PCT/CN2020/123318, filed on Oct. 23, 2020.

(30) Foreign Application Priority Data

Oct. 25, 2019 (CN) .......................... 201911023330.1

(51) Int. Cl.
*H04N 23/667* (2023.01)
*H04N 23/80* (2023.01)

(52) U.S. Cl.
CPC ......... *H04N 23/667* (2023.01); *H04N 23/815* (2023.01)

(58) Field of Classification Search
CPC ............................ H04N 23/667; H04N 23/815
USPC ........................................................ 348/471
See application file for complete search history.

(56) References Cited

U.S. PATENT DOCUMENTS

| 8,040,386 | B2 * | 10/2011 | Inamoto | ................. H04N 5/772 |
| | | | | 348/240.99 |
| 8,397,179 | B2 * | 3/2013 | Takagi | ..................... G09G 5/14 |
| | | | | 715/866 |
| 9,661,219 | B2 * | 5/2017 | Wakazono | ........... H04N 23/611 |

FOREIGN PATENT DOCUMENTS

| CN | 103618933 A | 3/2014 |
| CN | 104580858 A | 4/2015 |
| CN | 105787955 A | 7/2016 |
| CN | 107105172 A | 8/2017 |
| CN | 108513062 A | 9/2018 |
| CN | 110602410 A | 12/2019 |

(Continued)

OTHER PUBLICATIONS

WO 2019071548 A1 (Apr. 18, 2019) Fandy Zhang, H04N 23/60 (Year: 2019).*

(Continued)

*Primary Examiner* — Trang U Tran
(74) *Attorney, Agent, or Firm* — Frank Gao, Esq.

(57) ABSTRACT

The embodiments are an image processing method and apparatus, an aerial camera and a storage medium. The method includes: receiving an image mode switching instruction, wherein the image mode switching instruction is configured to indicate to switch a current image mode into a target image mode, and the image mode switching instruction carries the target image mode; and processing a collected image according to the target image mode. Therefore, the image can be flexibly processed based on the target image mode in the image mode switching instruction, such that the image display requirements in different scenarios are met.

17 Claims, 3 Drawing Sheets

(56) References Cited

FOREIGN PATENT DOCUMENTS

JP  2009112033 A   5/2009
WO  2019071548 A1  4/2019

OTHER PUBLICATIONS

International Search Report mailed Jan. 27, 2021; PCT/CN2020/123318 with English translation.

* cited by examiner

FIG. 7

IMAGE PROCESSING METHOD AND APPARATUS, AERIAL CAMERA AND STORAGE MEDIUM

CROSS-REFERENCE TO RELATED APPLICATIONS

The present application is a continuation of the International Application No. PCT/CN2020/123318, filed on Oct. 23, 2020, which claims priority of Chinese patent No. 201911023330.1, filed on Oct. 25, 2019, both of which are hereby incorporated by reference in their entireties.

BACKGROUND

Technical Field

Embodiments of the present invention relate to image processing technologies, in particular to an image processing method and apparatus, an aerial camera and a storage medium.

Related Art

Since image modes of an aerial camera correspond to different resolutions and frame rates of images, a user needs to use different image modes of the aerial camera in different usage scenarios. For example, high-frame-rate images are required in high-motion scenarios to capture details in high-motion images (e.g., racing car and waterfall scenes). High-definition and large-resolution images are required in some scenarios (for example, natural landscape scenarios), and images need to be displayed at normal resolutions and frame rates on some playback terminals that do not support large-resolution or high-frame-rate images. Similarly, when images and videos are shared on a terminal, a large-resolution and high-frame-rate image mode is also not required; and even when a plurality of photos or videos is stored on a terminal, a low-resolution and low-frame-rate image mode is required. However, under a constraint of an output performance of the existing image sensor, the terminal can only display images in a fixed image mode.

SUMMARY

The present invention provides an image processing method, apparatus and an aerial camera, and a storage medium, which can flexibly adjust an image mode and process an image based on the image mode, so as to meet image display requirements in different scenarios.

In a first aspect, an embodiment of the present invention provides an image processing method. The method includes:

receiving an image mode switching instruction, wherein the image mode switching instruction is configured to indicate to switch a current image mode into a target image mode, and the image mode switching instruction carries the target image mode; and processing a collected image according to the target image mode.

In a second aspect, an embodiment of the present invention further provides an image processing apparatus. The apparatus includes:

a receiving module, configured to receive an image mode switching instruction, wherein the image mode switching instruction is configured to indicate to switch a current image mode into a target image mode, and the image mode switching instruction carries the target image mode; and a processing module, configured to process a collected image according to the target image mode.

In a third aspect, an embodiment of the present invention further provides a computer-readable storage medium. The computer-readable storage medium stores a computer program therein, wherein the computer program, when being executed by a processor, causes the processor to perform an image processing method in any embodiment of the present invention.

In a fourth aspect, an embodiment of the present invention provides an aerial camera. The camera includes:

a memory, a processor, wherein the memory stores a computer program executable on the processor, and the computer program when being executed by the processor, causes the processor to perform the image processing method in any embodiment of the present invention.

Embodiments of the present invention provide an image processing method and apparatus, an aerial camera and a storage medium. The method includes: receiving an image mode switching instruction, wherein the image mode switching instruction is configured to indicate to switch a current image mode into a target image mode, and the image mode switching instruction carries the target image mode; and processing a collected image according to the target image mode. Therefore, the image can be flexibly processed based on the target image mode in the image mode switching instruction, such that the image display requirements in different scenarios are met.

DETAILED DESCRIPTION

The present invention will be further described below in conjunction with the accompanying drawings and embodiments. It can be understood that the specific embodiments described here are only used to explain the present invention, but not intended to limit the present invention. In addition, it should be further noted that, for ease of description, only the parts related to the present invention but not all of structures are shown in the accompanying drawings.

In addition, in the embodiments of the present application, terms such as "optionally" or "exemplarily" are used to represent examples, illustrations, or illustrations. Any embodiments or designs described in the embodiments of the present invention as "optionally" or "exemplarily" should not be construed as being more preferred or advantageous over other embodiments or designs. Exactly, the use of terms such as "optionally" or "exemplarily" is intended to present the related concepts in a specific manner.

Figure 1:
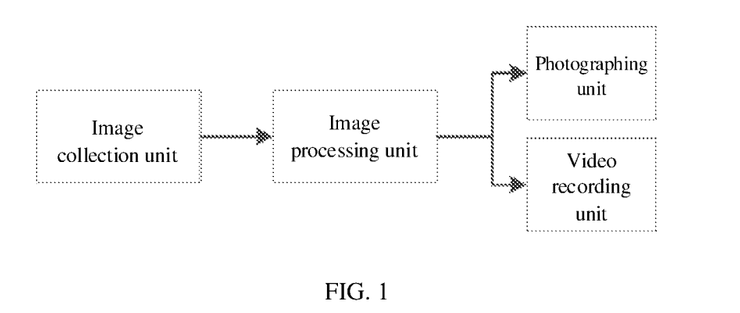
FIG. 1 is a schematic diagram of a processing flow of an aerial camera in existing technologies.

As shown in FIG. 1, a processing flow of an entire aerial camera is as follows: after the aerial camera collects an image by using a high-definition image sensor, the image is input to an image processing unit; and the size of the image is reduced via the image processing unit, and then transmitted to a photographing unit and a video recording unit respectively to present an image or video.

However, since a total image output performance A of each image sensor is fixed, this performance limits a resolution (image width w, height h) and a frame rate f of the image, as shown in Formula (1).

$$A = w \times h \times f \qquad (1)$$

If the collected image uses a maximum resolution, that is, w and h are maximums, it can be seen from Formula (1) that the frame rate f of the image will be relatively low, and such resolution and frame rate are more suitable for photographing scenarios. The resolution of the image needs to be reduced in need of increase in the frame rate.

Figure 2A:
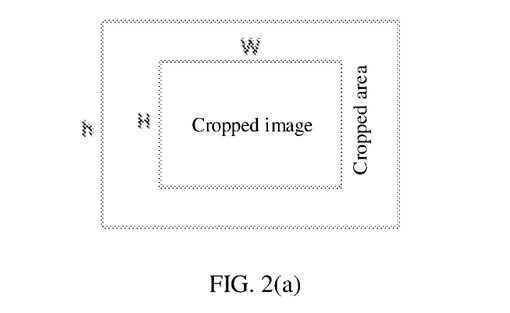
FIG. 2(a) is a schematic diagram of a cropped image in the existing technologies.
Figure 2B:
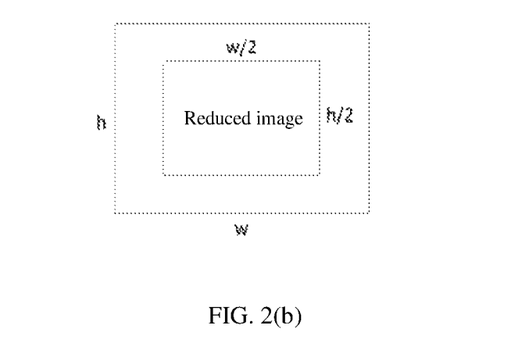
FIG. 2(b) is a schematic diagram of the size of an image reduced by a multiple in the existing technologies.

There are two existing ways to reduce the resolution of an image, as shown in FIG. 2, which include: cropping the image, and scaling the image by a multiple.

When the image is cropped, a field angle of the image will be reduced since only the middle part of the image is retained in the cropping process. If a frame rate of the image does not need to be increased too much, and the field angle after cropping falls within an allowable range, this processing method can be considered to not lose the original image quality.

On the contrary, if the user wants to greatly increase the frame rate without reducing the field angle of the image by means of cropping, the image can be scaled by a multiple, for example, the height and width of the image are reduced by ½ or ¼.

Figure 3:
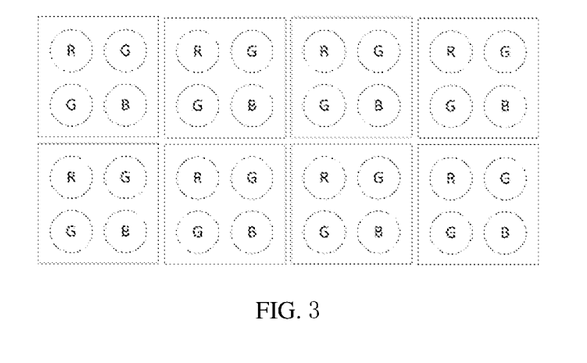
FIG. 3 is a schematic diagram of pixel points of the reduced image in the existing technologies.

By means of such implementation manner, a plurality of pixel points is merged into the same point and then output. As shown in FIG. 3, small dots refer to pixel points of an original image; and after the height and width of the image are both reduced to ½, four pixel points are merged into one pixel point, that is, a block refers to the pixel points after the image is reduced by a multiple.

However, this processing manner has no filtering processing with a special reduction algorithm, resulting in relatively rough edge saw teeth. Therefore, it can only be used in scenarios that require good low illumination effects or high frame rate output.

Embodiment 1

Figure 4:
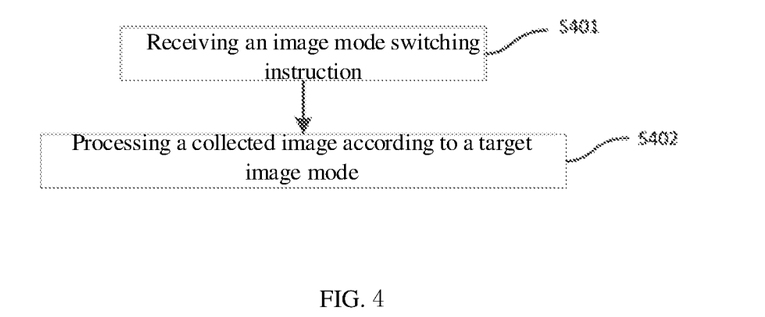
FIG. 4 is a flowchart of an image processing method in Embodiment 1 of the present invention.

Based on the above reasons, an embodiment of the present invention provides an image processing method, which may be applied to an aerial camera usage scenario. The specific process is shown in FIG. 4, including the following steps S401-402.

In S401, an image mode switching instruction is received.

If a current image display mode cannot meet the user's usage needs, for example, a terminal, when an image resolution is too high, cannot support this high-resolution display mode, or the user needs to store more images, videos, etc. on the terminal in a low-resolution manner, the user will send an image mode switching instruction to the aerial camera through a display terminal, so as to instruct the aerial camera to switch a current image mode to a target image mode.

Optionally, the image mode switching instruction may carry the target image mode.

It should be noted that the user may use any implementation manner in the existing technologies to send the image mode switching instruction to the aerial camera through the display terminal, which is not limited in this embodiment of the present invention.

In S402, a collected image is processed according to the target image mode.

Exemplarily, when the target image mode is a secondary reduced image resolution mode, the present invention provides an implementation manner that is used to process the collected image according to the target image mode. This implementation manner includes: reducing an image resolution, and processing, according to a scaling relationship between the target image mode and a first image mode, a pixel point brightness of the image.

The secondary reduced image resolution mode may refer to reducing the image resolution again based on the image mode after the reduction of the image resolution; and the first image mode refers to an image mode after the resolution reduction.

The image resolution may be reduced by cropping the image; and/or, scaling the image resolution by a multiple.

Optionally, the target image mode may also refer to cropping the image; and/or scaling the image resolution by a multiple.

Of course, it may be understood by those skilled in the art that when the target image mode refers to chopping the image and/or scaling the image resolution by a multiple, the image resolution may be processed by adopting a corresponding processing method.

To be specific, the pixel point brightness of the image is processed according to the scaling relationship between the target image mode and the first image mode; and a pixel point brightness of the image in the target image mode may be re-determined based on the pixel point brightness of the image in the first image mode according to the scaling relationship between the target image mode and the first image mode.

Optionally, an embodiment of the present invention provides an implementation manner that re-determines, according to the scaling relationship between the target image mode and the first image mode, the pixel point brightness of the image in the target image mode based on the pixel point brightness of the image in the first image mode. This implementation manner is described as follows:

if the scaling relationship between the target image mode and the first image mode satisfies a first condition, it is indicated that a width reduction multiple in the resolution of the target image mode is relatively large compared to the height reduction, and the target image mode may be based on pixels in a horizontal direction.

Figure 5:
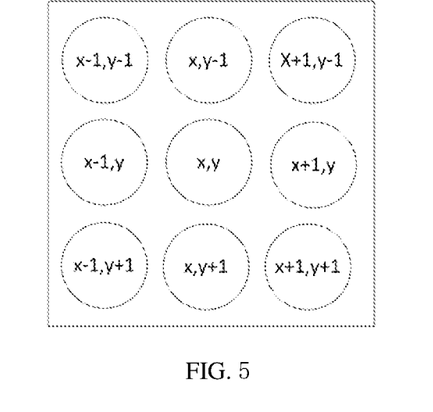
FIG. 5 is a schematic diagram of pixel points of a scaled image in Embodiment 1 of the present invention.

As shown in FIG. 5, assuming that the image width and height of the first image mode are w and h respectively, the brightness of a pixel point (x, y) is I(x, y), the image width and height of the target mode are W and H respectively, and the brightness of a pixel point (X, Y) is I(X, Y), Formulas (2) and (3) are obtained by equally proportional scaling:

$$\frac{X}{W} = \frac{x}{w} \qquad (2)$$

$$\frac{Y}{H} = \frac{y}{h} \quad (3)$$

wherein the first condition is $$\frac{w}{W} > 2\frac{h}{H}.$$

Further, if the pixel point brightness of the image in the first image mode satisfies a first pixel condition, it is indicated that the periphery of the pixel point (x, y) is unbalanced, then the pixel point brightness of the image in the target image mode is determined as I(X, Y)=I(xW/w, yH/h); and if the pixel point brightness of the image in the first image mode satisfies a second pixel condition, it is indicated that the periphery of the pixel point (x, y) is smooth, then the pixel point brightness of the image in the target image mode is determined as $$I(X, Y) = \frac{I(x-1, y) + I(x+1, y)}{2};$$

wherein the first pixel condition is |I(x−1, y)−I(x+1, y)|>T, the second pixel condition is |I(x−1, y)−I(x+1, y)|≤T, and T is a threshold value.

Optionally, an embodiment of the present invention provides another implementation manner that re-determines, according to the scaling relationship between the target image mode and the first image mode, a pixel point brightness of the image in the target image mode based on the pixel point brightness of the image in the first image mode. This implementation manner is described as follows:

if the scaling relationship between the target image mode and the first image mode satisfies a second condition, it is indicated that a height reduction multiple in the resolution of the target image mode is relatively large compared to the width reduction, and the target image mode may be based on pixels in a vertical direction.

Further, if the pixel point brightness of the image in the first image mode satisfies a third pixel condition, it is indicated that the periphery of the pixel point (x, y) is unbalanced, then the pixel point brightness of the image in the target image mode is determined as I(X, Y)=I(xW/w, yH/h); and if the pixel point brightness of the image in the first image mode satisfies a fourth pixel condition, it is indicated that the periphery of the pixel point (x, y) is smooth, then the pixel point brightness of the image in the target image mode is determined as $$I(X, Y) = \frac{I(x-1, y) + I(x+1, y)}{2};$$

wherein the second condition is $$\frac{h}{H} > 2\frac{w}{W},$$

the third pixel condition is |I(x, y−1)−I(x, y+1)|>T, the fourth pixel condition is |I(x, y−1)−I(x, y+1)|≤T, and T is a threshold value.

Optionally, an embodiment of the present invention provides yet another implementation manner that re-determines, according to the scaling relationship between the target image mode and the first image mode, a pixel point brightness of the image in the target image mode based on the pixel point brightness of the image in the first image mode. This implementation manner is described as follows:

if the scaling relationship between the target image mode and the first image mode does not satisfy the first condition and the second condition, it is indicated that the height scaling multiple and the width scaling multiple in the resolution of the target image mode are not much different, and the target image mode may be based on the pixels in a hypotenuse direction.

Further, if the pixel point brightness of the image in the first image mode satisfies a fifth pixel condition, it is indicated that the pixel point brightness of the image in the target image mode is determined as I(X, Y)=I(xW/w, yH/h); and if the pixel point brightness of the image in the first image mode satisfy a sixth pixel condition, it is indicated that the pixel point brightness of the image in the target image mode is determined as $$I(X, Y) = \frac{I(x-1, y-1) + I(x+1, y-1) + I(x-1, y+1) + I(x+1, y+1)}{4};$$

wherein the fifth pixel condition is |I(x−1, y−1)−I(x+1, y+1)|>T or |I(x−1, y+1)−I(x+1, y−1)|>T, the sixth pixel condition is |I(x−1, y−1)−I(x+1, y+1)|≤T and |I(x−1, y+1)−I(x+1, y−1)|≤T, and T is a threshold value.

According to the above-mentioned image processing method, image details can be better retained when the size of the image is reduced. In this way, in some scenarios with relatively high requirements for frame rates, if the user does not want to reduce a field angle of an image, and meanwhile the resolution of the target image mode is not an integer scaling multiple of the original image resolution, the frame rate of the image can be increased at an image acquisition terminal, and meanwhile, the image resolution can be scaled by a multiple. Further, the image resolution is processed as the resolution of the target image mode by using the above-mentioned image processing method.

In addition, it can be seen from the above embodiments that the target image mode can be implemented in multiple manners, for example:

(1) adopting a maximum resolution;
(2) cropping an image and increasing a frame rate;
(3) scaling the image resolution by a multiple (for example, reducing the resolution to ½ or ¼), and increasing the frame rate;
(4) cropping the image, increasing the frame rate, and reducing the image resolution again;
(5) scaling the image resolution by a multiple, increasing the frame rate, and reducing the image resolution again;
(6) cropping the image, scaling the image resolution by a multiple, and increasing the frame rate; and
(7) cropping the image, scaling the image resolution by a multiple, increasing the frame rate, and reducing the image resolution again.

Exemplarily, the above implementation manners can be described with specific numbers. Assuming that the original collected image has a resolution of 8000*6000 and a frame rate of 19fps, the above implementation manners are shown in Table 1.

TABLE 1

| Target image mode (resolution, frame rate) | Reducing resolution | Reducing image resolution again |
|---|---|---|
| 8000* 6000, 19 fps | Not processed | Not processed |
| 7680* 4320, 25 fps | Not processed | Not processed |
| 3840* 2160, 60 fps | Cropping from 8000*6000 to 7680*4320, and then scaling by ½ to 3840*2160, and increasing the frame rate to 60 fps | Not processed |
| 2720* 1528, 30 fps | Cropping from 8000*6000 to 7680*4320, and then scaling by ½ to 3840*2160, and increasing the frame rate to 30 fps | Scaling from 3840*2160 to 2720*1528 |

An embodiment of the present invention provides an image processing method. The method specifically includes: receiving an image mode switching instruction, wherein the image mode switching instruction is configured to indicate to switch a current image mode into a target image mode, and the image mode switching instruction carries the target image mode; and processing a collected image according to the target image mode. Therefore, the image can be flexibly processed based on the target image mode carried in the image mode switching instruction, such that the image display requirements in different scenes are met.

Embodiment 2

Figure 6:
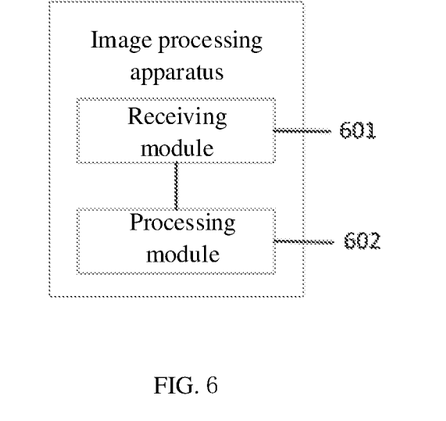
FIG. 6 is a schematic structural diagram of an image processing apparatus in Embodiment 2 of the present invention.

An embodiment of the present invention provides an image processing apparatus. As shown in FIG. 6, the apparatus includes a receiving module 601 and a processing module 602.

The receiving module 601 is configured to receive an image mode switching instruction, wherein the image mode switching instruction is configured to indicate to switch a current image mode into a target image mode, and the image mode switching instruction carries the target image mode; and the processing module 602 is configured to process a collected image according to the target image mode.

Further, when the target image mode is a secondary reduced image resolution mode, the processing module 602 processing the collected image according to the target image mode includes:

reducing an image resolution, and processing, according to a scaling relationship between the target image mode and a first image mode, a pixel point brightness of the image, wherein the secondary reduced image resolution mode may refer to reducing the image resolution again based on the image mode after the reduction of the image resolution; and the first image mode is an image mode after the resolution reduction.

The image resolution may be reduced by cropping the image; and/or, scaling the image resolution by a multiple.

Further, the processing, according to the scaling relationship between the target image mode and the first image mode, the pixel point brightness of the image includes:

re-determining, according to the scaling relationship between the target image mode and the first image mode, the pixel point brightness of the image in the target image mode based on the pixel point brightness of the image in the first image mode.

Optionally, an embodiment of the present invention provides an implementation manner that re-determines, according to the scaling relationship between the target image mode and the first image mode, the pixel point brightness of the image in the target image mode based on the pixel point brightness of the image in the first image mode. This implementation manner is described as follows:

if the scaling relationship between the target image mode and the first image mode satisfies a first condition and the pixel point brightness of the image in the first image mode satisfies a first pixel condition, determining the pixel point brightness of the image in the target image mode as I(X, Y)=I(xW/w, yH/h); and if the scaling relationship between the target image mode and the first image mode satisfies the first condition and the pixel point brightness of the image in the first image mode satisfies a second pixel point condition, determining the pixel point brightness of the image in the target image mode as $$I(X, Y) = \frac{I(x-1, y) + I(x+1, y)}{2};$$

wherein the first condition is $$\frac{w}{W} > 2\frac{h}{H}, l$$

w is an image width of the first image mode, h is an image height of the first image mode, W is an image width of the target image mode, and H is an image height of the target image mode; and the first pixel condition is |I(x−1, y)−I(x+1, y)|>T, the second pixel condition is |I(x−1, y)−I(x+1, y)|≤T, T is a threshold value, and x and y are pixel point coordinates of the image in the first image mode.

Optionally, an embodiment of the present invention provides an implementation manner that re-determines, according to the scaling relationship between the target image mode and the first image mode, the pixel point brightness of the image in the target image mode based on the pixel point brightness of the image in the first image mode. This implementation manner is described as follows:

if the scaling relationship between the target image mode and the first image mode satisfies the second condition and the pixel point brightness of the image in the first image mode satisfies a third pixel condition, determining the pixel point brightness of the image in the target image mode as I(X, Y)=I(xW/w, yH/h); and if the scaling relationship between the target image mode and the first image mode satisfies the second condition and the pixel point brightness of the image in the first image mode satisfies a fourth pixel condition, determining the pixel point brightness of the image in the target image mode as $$I(X, Y) = \frac{I(x-1, y) + I(x+1, y)}{2};$$

wherein the second condition is $$\frac{h}{H} > 2\frac{w}{W},$$

w is an image width of the first image mode, h is an image height of the first image mode, W is an image width of the target image mode, and H is an image height of the target image mode; and the third pixel condition is |I(x, y−1)−I(x, y+1)|>T, the fourth pixel condition is |I(x, y−1)−I(x, y+1)|≤T, T is a threshold value, and x and y are pixel point coordinates of the image in the first image mode.

Optionally, an embodiment of the present invention provides an implementation manner that re-determines, according to the scaling relationship between the target image mode and the first image mode, the pixel point brightness of the image in the target image mode based on the pixel point brightness of the image in the first image mode. This implementation manner is described as follows:

if the scaling relationship between the target image mode and the first image mode does not satisfy the first condition and the second condition and the pixel point brightness of the image in the first image mode satisfies a fifth pixel condition, determining the pixel point brightness of the image in the target image mode as I(X, Y)=I(xW/w, yH/h); and if the scaling relationship between the target image mode and the first image mode does not satisfy the first condition and the second condition and the pixel point brightness of the image in the first image mode satisfies a sixth pixel condition, determining the pixel point brightness of the image in the target image mode as $$I(X, Y) = \frac{I(x-1, y-1) + I(x+1, y-1) + I(x-1, y+1) + I(x+1, y+1)}{4};$$

wherein the first condition is $$\frac{w}{W} > 2\frac{h}{H},$$

the second condition is $$\frac{h}{H} > 2\frac{w}{W},$$

w is an image width of the first image mode, h is an image height of the first image mode, W is an image width of the target image mode, and H is an image height of the target image mode; and the fifth pixel condition is |I(x−1, y−1)−I(x+1, y+1)|>T or |I(x−1, y+1)−I(x+1, y−1)|>T, the sixth pixel condition is |I(x−1, y−1)−I(x+1, y+1)|≤T and |I(x−1, y+1)−I(x+1, y−1)|≤T, T is a threshold value, and x and y are pixel point coordinates of the image in the first image mode.

An image processing apparatus in the embodiment of the present invention can execute an image processing method in Embodiment 1 of the present invention, and has corresponding functional modules for executing this method and beneficial effects.

Embodiment 3

Figure 7:
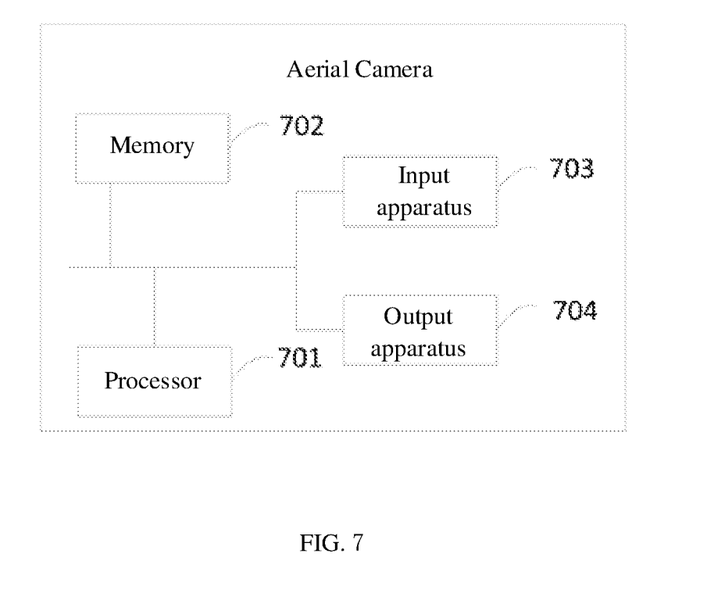
FIG. 7 is a schematic structural diagram of an aerial camera in Embodiment 3 of the present invention.

FIG. 7 is a schematic structural diagram of an aerial camera in the present invention. As shown in FIG. 7, the device includes a processor 701, a memory 702, an input apparatus 703 and an output apparatus 704. The number of the processor 701 in the device may be one or more, and one processor 701 is taken as an example in FIG. 7. The processor 701, the memory 702, the input apparatus 703, and the output apparatus 704 in the device may be connected by a bus or in other ways, and the connection by a bus is taken as an example in FIG. 7.

The memory 702 serves as a computer-readable storage medium and is configured to store software programs, computer-executable programs, and modules, such as program instructions/modules (e.g., the receiving module 601 and the processing module 602 in the image processing apparatus) corresponding to the image processing method in Embodiment 1 of the present invention. The processor 701 executes various functional applications and data processing of the device by running software programs, instructions, and modules stored in the memory 702, so as to realize the above image processing method.

The memory 702 may mainly include a program storage area and a data storage area. The program storage area may store application programs required by an operating system and at least one function. The data storage area may store data created based on the use of the terminal, and the like. In addition, the memory 702 may include a high-speed random access memory, and may further include a non-volatile memory, such as at least one magnetic disk storage device, a flash memory device, or other non-volatile solid-state storage devices. In some examples, the memory 702 may further include a memory remotely provided with respect to the processor 801. These remote memories may be connected to the device/terminal/service via a network. Examples of the networks include, but are not limited to, the Internet, an intranet, a local area network, a mobile communication network, and combinations thereof.

The input apparatus 703 may be configured to receive input digital or character information, and generate key signal input related to user settings and function control of the device. The output apparatus 704 may include a display device such as a display screen.

Embodiment 4

Embodiment 4 of the present invention further provides a storage medium storing a computer-executable instruction, the computer-executable instruction being executed by a computer processor to execute an image processing method. The method includes:

receiving an image mode switching instruction, wherein the image mode switching instruction is configured to indicate to switch a current image mode into a target image mode, and the image mode switching instruction carries the target image mode; and processing a collected image according to the target image mode.

Of course, according to a storage medium storing computer-executable instructions in this embodiment of the present invention, the computer-executable instructions thereof are not limited to the above-mentioned method operations, and can also perform related operations in the image processing method in any embodiment of the present invention.

Through the above description to the embodiments, it can be clearly understood by those skilled in the art that, the present invention may be implemented by software and necessary common hardware, and of course may be implemented by hardware, but preferably by software and necessary common hardware in many cases. Based on such understandings, the technical solutions of the present invention or the part thereof contributing to the p existing technologies may be substantially reflected in the form of a software product. The computer software product may be stored in a computer-readable storage medium, and includes several instructions to cause a computer device (which may be a personal computer, a server or a network device) to perform the method according to each of the embodiments of the present invention, the storage medium including a floppy disk of a computer, a read-only memory (ROM), a random access memory (RAM), a flash, a hard disk, an optical disk, or the like.

It is worth noting that, in the embodiments of the image processing apparatus, each unit and module therein are only divided according to functional logic, but not limited to the above division, as long as the corresponding functions can be realized. In addition, the specific name of each functional unit is only for the convenience of distinguishing each other, and is not used to limit the protection scope of the present invention.

It should be noted that the above descriptions are merely preferred embodiments of the present invention and an explanation of the applied technical principles. Those skilled in the art will understand that the present invention is not limited to the specific embodiments described herein, and various obvious changes, readjustments and substitutions can be made by those skilled in the art without departing from the protection scope of the present invention. Therefore, although the present invention has been described in detail through the above embodiments, the present invention is not limited to the above embodiments, and can also include more other equivalent embodiments without departing from the concept of the present invention. The scope of the present invention is based on the scope of the appended claims.

What is claimed is:

1. An image processing method, comprising:
receiving an image mode switching instruction, wherein the image mode switching instruction is configured to indicate to switch a current image mode into a target image mode, the image mode switching instruction carrying the target image mode; and
processing a collected image according to the target image mode;
wherein re-determining, according to the sealing relationship between the target image mode and the first image mode, the pixel point brightness of the image in the target image mode based on the pixel point brightness of the image in the first image mode comprises:
when the sealing relationship between the target image mode and the first image mode satisfies a first condition and the pixel point brightness of the image in the first image mode satisfies a first pixel condition, determining the pixel point brightness of the image in the target image mode as $I(X, Y)=I(xW/w, yH/h)$; and
when the seal relationship between the target image mode and the first image mode satisfies the first condition and the pixel point brightness of the image in the first image mode satisfies a second pixel condition, determining the pixel point brightness of the image in the target image mode as $$I(X, Y) = \frac{I(x-1, y) + I(x+1, y)}{2};$$

wherein the first condition is $$\frac{w}{W} > 2\frac{h}{H},$$

w is an image width of the first image mode, h is an image height of the first image mode, W is an image width of the target image mode, and H is an image height of the target image mode; and
the first pixel condition is $|I(x-1, y)-I(x+1, y)|>T$, the second pixel condition is $|I(x-1, y)-I(x+1, y)|\leq T$, T is a threshold value, and x and y are pixel point coordinates of the image in the first image mode.

2. The method according to claim 1, wherein when the target image mode is a secondary reduced image resolution mode, processing the collected image according to the target image mode comprises:
reducing an image resolution, and processing, according to a scaling relationship between the target image mode and a first image mode, a pixel point brightness of the image, wherein
the secondary reduced image resolution mode is to reduce an image resolution again based on the image mode after the reduction of the image resolution; and the first image mode is an image mode after the resolution reduction.

3. The method according to claim 2, wherein the reduction of the image resolution comprises:
cropping the image;
and/or, scaling the image resolution by a multiple.

4. The method according to claim 2, wherein processing, according to the scaling relationship between the target image mode and the first image mode, the brightness of the image pixel points comprises:
re-determining, according to the scaling relationship between the target image mode and the first image mode, the pixel point brightness of the image in the target image mode based on the pixel point brightness of the image in the first image mode.

5. The method according to claim 1, wherein re-determining, according to the scaling relationship between the target image mode and the first image mode, the pixel point brightness of the image in the target image mode based on the pixel point brightness of the image in the first image mode comprises:
when the scaling relationship between the target image mode and the first image mode satisfies a second condition and the pixel point brightness of the image in the first image mode satisfies a third pixel condition, determining the pixel point brightness of the image in the target image mode as $I(X, Y)=I(xW/w, yH/h)$; and
when the scaling relationship between the target image mode and the first image mode satisfies the second condition and the pixel point brightness of the image in the first image mode satisfies a fourth pixel condition, determining the pixel point brightness of the image in the target image mode as $$I(X, Y) = \frac{I(x, y-1) + I(x, y+1)}{2};$$

wherein the second condition is $$\frac{h}{H} > 2\frac{w}{W},$$

w is an image width of the first image mode, h is an image height of the first image mode, W is an image width of the target image mode, and H is an image height of the target image mode; and the third pixel condition is |I(x, y−1)−I(x, y+1)|>T, the fourth pixel condition is |I(x, y−1)−I(x, y+1)|≤T, T is a threshold value, and x and y are pixel point coordinates of the image in the first image mode.

6. The method according to claim 1, wherein the step of re-determining, according to the scaling relationship between the target image mode and the first image mode, the pixel point brightness of the image in the target image mode based on the pixel point brightness of the image in the first image mode comprises:

when the scaling relationship between the target image mode and the first image mode does not satisfy the first condition and the second condition, and the pixel point brightness of the image in the first image mode satisfies a fifth pixel condition, determining the pixel point brightness of the image in the target image mode as I(X, Y)=I(xW/w, yH/h); and when the scaling relationship between the target image mode and the first image mode does not satisfy the first condition and the second condition, the pixel point brightness of the image in the first image mode satisfies a sixth pixel condition, determining the pixel point brightness of the image in the target image mode as $$I(X, Y) = \frac{I(x-1, y-1) + I(x+1, y-1) + I(x-1, y+1) + I(x+1, y+1)}{4};$$

wherein the first condition is $$\frac{w}{W} > 2\frac{h}{H},$$

the second condition is $$\frac{h}{H} > 2\frac{w}{W},$$

w is an image width of the first image mode, h is an image height of the first image mode, W is an image width of the target image mode, and H is an image height of the target image mode; and the fifth pixel condition is |I(x−1, y−1)−I(x+1, y+1)|>T or |I(x−1, y+1)−I(x+1, y−1)|>T, the sixth pixel condition is |I(x−1, y−1)−I(x+1, y+1)|≤T and |I(x−1, y+1)−I(x+1, y−1)|≤T, T is a threshold value, and x and y are pixel point coordinates of the image in the first image mode.

7. An aerial camera, comprising a memory, a processor, wherein the memory stores a program executable on the processor, the program, when being executed by the processor, causing the processor to: receive an image mode switching instruction, wherein the image mode switching instruction is configured to indicate to switch a current image mode into a target image mode, the image mode switching instruction carrying the target image mode; and process a collected image according to the target image mode;

wherein the processor is further configured to:

when the scaling relationship between the target image mode and the first image mode satisfies a second condition and the pixel point brightness of the image in the first image mode satisfies a third pixel condition, determining the pixel point brightness of the image in the target image mode as I(X, Y)=I(xW/w, yH/h); and when the scaling relationship between the target image mode and the first image mode satisfies the second condition and the pixel point brightness of the image in the first image mode satisfies a fourth pixel condition, determining the pixel point brightness of the image in the target image mode as $$I(X, Y) = \frac{I(x-1, y) + I(x+1, y)}{2};$$

wherein the second condition is $$\frac{w}{W} > 2\frac{h}{H},$$

w is an image width of the first image mode, h is an image height of the first image mode, W is an image width of the target image mode, and H is an image height of the target image mode; and the third pixel condition is |I(x−1, y)−I(x+1, y)|>T, the second pixel condition is |I(x−1, y)−I(x+1, y)|≤T, T is a threshold value, and x and y are pixel point coordinates of the image in the first image mode.

8. The aerial camera according to claim 7, wherein when the target image mode is a secondary reduced image resolution mode, the processor is further configured to:

reduce an image resolution, and process, according to a scaling relationship between the target image mode and a first image mode, a pixel point brightness of the image, wherein the secondary reduced image resolution mode is to reduce an image resolution again based on the image mode after the reduction of the image resolution; and the first image mode is an image mode after the resolution reduction.

9. The aerial camera according to claim 8, wherein the processor is further configured to:

crop the image;

and/or, scale the image resolution by a multiple.

10. The aerial camera according to claim 8, wherein the processor is further configured to:

re-determine, according to the scaling relationship between the target image mode and the first image mode, the pixel point brightness of the image in the target image mode based on the pixel point brightness of the image in the first image mode.

11. The aerial camera according to claim 7, wherein the processor is further configured to:

when the scaling relationship between the target image mode and the first image mode satisfies a second condition and the pixel point brightness of the image in the first image mode satisfies a third pixel condition, determine the pixel point brightness of the image in the target image mode as I(X, Y)=I(xW/w, yH/h); and when the scaling relationship between the target image mode and the first image mode satisfies the second condition and the pixel point brightness of the image in the first image mode satisfies a fourth pixel condition, determine the pixel point brightness of the image in the target image mode as $$I(X, Y) = \frac{I(x-1, y) + I(x+1, y)}{2};$$

wherein the second condition is $$\frac{h}{H} > 2\frac{w}{W},$$

w is an image width of the first image mode, h is an image height of the first image mode, W is an image width of the target image mode, and H is an image height of the target image mode; and the third pixel condition is |I(x, y−1)−I(x, y+1)|>T, the fourth pixel condition is |I(x, y−1)−I(x, y+1)|≤T, T is a threshold value, and x and y are pixel point coordinates of the image in the first image mode.

12. The aerial camera according to claim 7, wherein the processor is further configured to:

when the scaling relationship between the target image mode and the first image mode does not satisfy the first condition and the second condition, and the pixel point brightness of the image in the first image mode satisfies a fifth pixel condition, determine the pixel point brightness of the image in the target image mode as I(X, Y)=I(xW/w, yH/h); and when the scaling relationship between the target image mode and the first image mode does not satisfy the first condition and the second condition, the pixel point brightness of the image in the first image mode satisfies a sixth pixel condition, determine the pixel point brightness of the image in the target image mode as $$I(X, Y) = \frac{I(x-1, y-1) + I(x+1, y-1) + I(x-1, y+1) + I(x+1, y+1)}{4};$$

wherein the first condition is $$\frac{w}{W} > 2\frac{h}{H},$$

the second condition is $$\frac{h}{H} > 2\frac{w}{W},$$

w is an image width of the first image mode, h is an image height of the first image mode, W is an image width of the target image mode, and H is an image height of the target image mode; and the fifth pixel condition is |I(x−1, y−1)−I(x+1, y+1)|>T or |I(x−1, y+1)−I(x+1, y−1)|>T, the sixth pixel condition is |I(x−1, y−1)−I(x+1, y+1)|≤T and |I(x−1, y+1)−I(x+1, y−1)|≤T, T is a threshold value, and x and y are pixel point coordinates of the image in the first image mode.

13. A non-transitory computer readable storage medium for storing a program therein, wherein the program, when being executed by a processor, causes the processor to:

receive an image mode switching instruction, wherein the image mode switching instruction is configured to indicate to switch a current image mode into a target image mode, the image mode switching instruction carrying the target image mode; and process a collected image according to the target image mode;

wherein the processor is further configured to:

when the scaling relationship between the target image mode and the first image mode satisfies a first condition and the pixel point brightness of the image in the first image mode satisfies a first pixel condition, determining the pixel point brightness of the image in the target image mode as I(X, Y)=I(xW/w, yH/h); and when the scaling relationship between the target image mode and the first image mode satisfies the first condition and the pixel point brightness of the image in the first image mode satisfies a second pixel condition, determining the pixel point brightness of the image in the target image mode as $$I(X, Y) = \frac{I(x-1, y) + I(x+1, y)}{2};$$

wherein the second condition is $$\frac{w}{W} > 2\frac{h}{H},$$

w is an image width of the first image mode, h is an image height of the first image mode, W is an image width of the target image mode, and H is an image height of the target image mode; and the first pixel condition is |I(x−1, y)−I(x+1, y)|>T, the second pixel condition is |I(x−1, y)−I(x+1, y)|≤T, T is a threshold value, and x and y are pixel point coordinates of the image in the first image mode.

14. The non-transitory computer readable storage medium according to claim 13, wherein when the target image mode is a secondary reduced image resolution mode, the processor is further configured to:

reduce an image resolution, and process, according to a scaling relationship between the target image mode and a first image mode, a pixel point brightness of the image, wherein the secondary reduced image resolution mode is to reduce an image resolution again based on the image mode after the reduction of the image resolution; and the first image mode is an image mode after the resolution reduction.

15. The non-transitory computer readable storage medium according to claim 14, wherein the processor is further configured to:

re-determine according to the scaling relationship between the target image mode and the first image mode, the pixel point brightness of the image in the target image mode based on the pixel point brightness of the image in the first image mode.

16. The non-transitory computer readable storage medium according to claim 15, wherein the processor is further configured to:

when the scaling relationship between the target image mode and the first image mode satisfies a second condition and the pixel point brightness of the image in the first image mode satisfies a third pixel condition, determine the pixel point brightness of the image in the target image mode as I(X, Y)=I(xW/w, yH/h); and when the scaling relationship between the target image mode and the first image mode satisfies the second condition and the pixel point brightness of the image in the first image mode satisfies a fourth pixel condition, determine the pixel point brightness of the image in the target image mode as $$I(X, Y) = \frac{I(x, y-1) + I(x, y+1)}{2};$$

wherein the second condition is $$\frac{h}{H} > 2\frac{w}{W},$$

w is an image width of the first image mode, h is an image height of the first image mode, W is an image width of the target image mode, and H is an image height of the target image mode; and
the third pixel condition is |I(x, y−1)−I(x, y+1)|>T, the fourth pixel condition is |I(x, y−1)−I(x, y+1)|≤T, T is a threshold value, and x and y are pixel point coordinates of the image in the first image mode.

17. The non-transitory computer readable storage medium according to claim 13, wherein the processor is further configured to:
when the scaling relationship between the target image mode and the first image mode does not satisfy the first condition and the second condition, and the pixel point brightness of the image in the first image mode satisfies a fifth pixel condition, determine the pixel point brightness of the image in the target image mode as I(X, Y)=I(xW/w, yH/h); and when the scaling relationship between the target image mode and the first image mode does not satisfy the first condition and the second condition, the pixel point brightness of the image in the first image mode satisfies a sixth pixel condition, determine the pixel point brightness of the image in the target image mode as $$I(X, Y) = \frac{I(x-1, y-1) + I(x+1, y-1) + I(x-1, y+1) + I(x+1, y+1)}{4};$$

wherein the first condition is $$\frac{w}{W} > 2\frac{h}{H},$$

the second condition is $$\frac{h}{H} > 2\frac{w}{W},$$

w is an image width of the first image mode, h is an image height of the first image mode, W is an image width of the target image mode, and H is an image height of the target image mode; and
the fifth pixel condition is |I(x−1, y−1)−I(x+1, y+1)|>T or |I(x−1, y+1)−I(x+1, y−1)|>T, the sixth pixel condition is |I(x−1, y−1)−I(x+1, y+1)|≤T and |I(x−1, y+1)−I(x+1, y−1)|≤T, T is a threshold value, and x and y are pixel point coordinates of the image in the first image mode.

* * * * *